UNITED STATES PATENT OFFICE.

RUDOLF ADLER, OF AMSTERDAM, NETHERLANDS, ASSIGNOR TO NAAMLOOZE VENNOOTSCHAP ALGEMEENE UITVINDING EXPLOITATIE MAATSCHAPPIJ, OF AMSTERDAM, NETHERLANDS.

PROCESS OF MAKING ANIMAL CHARCOAL.

1,151,553.   Specification of Letters Patent.   Patented Aug. 31, 1915.

No Drawing.   Application filed October 2, 1913.   Serial No. 792,961.

*To all whom it may concern:*

Be it known that I, RUDOLF ADLER, a chemist and a doctor of philosophy, a subject of the Emperor of Austria-Hungary, and a resident of 46 Amsteldijk, in the city of Amsterdam, Netherlands, have invented a certain new and useful Process of Making Animal Charcoal, of which the following is a specification.

In view of the known power possessed by animal charcoal to adsorb various substances, experiments having for their object the production of a charcoal of the highest possible value in this respect have not been lacking. In particular efforts have been made to produce a charcoal which, while possessing in high degree the power of adsorption, does not part with any constituent or admixture to the medium with which the charcoal is mixed. These requirements are more or less satisfied only by animal charcoal made from certain organic nitrogenous substances, particularly blood or flesh. The process of making such charcoal on a large scale presents a number of well known difficulties. For example, the usual process yields a charcoal having the aforesaid requirements, only when on the one hand flesh completely free from fat or freshly drawn blood is used, and on the other hand when substances adapted to accelerate the carbonization, such as phosphates (bones) or carbonates (sodium carbonate) are added to the flesh or blood. This mode of working entails a very costly process in consequence of the nature of the material carbonized, the cost being increased by the very lengthy washing which must follow the carbonization, since the carbonized substances, as is only to be expected from their properties, retain very persistently the admixed accelerating materials.

The present invention relates to the manufacture of a particularly active animal charcoal which, while retaining the usual operation, yields in a simple manner a very cheap product, which in respect of its adsorptive power and purity fulfils the most exacting requirements.

The manufacture is as follows:—sea-water or fresh water fish are well washed with cold water and then boiled in a comminuted condition for 3–5 hours with 2–5 times their weight of water. At the end of this boiling period the mass is decanted and the supernatant liquid thus freed from bones is allowed to stand until it has thickened to a syrupy consistency. The syrup thus made is completely dried, preferably in a vacuum. The sub-divided material thus obtained is carbonized in the usual manner whereafter it is washed with hydrochloric acid and water as may be necessary. The product obtained in this manner is when ground a dark brownish-black powder which is not hygroscopic and contains approximately 100 per cent. of nitrogenous carbon; in respect of its adsorptive power and purity it fulfils the most exacting requirements.

I claim:—

Process of making animal charcoal which consists in washing and afterward boiling fish, drying the resulting mass and carbonizing the dried mass.

RUDOLF ADLER.

Witnesses:
 WOLDEMAR HAUPT,
 HENRY HASPER.